(12) United States Patent
Frank

(10) Patent No.: US 9,739,263 B2
(45) Date of Patent: Aug. 22, 2017

(54) WIND POWER PLANT

(75) Inventor: Hubertus Frank, Höchstadt (DE)

(73) Assignee: IMO Holding GmbH, Gremsdorf (DE)

( * ) Notice: Subject to any disclaimer, the term of this patent is extended or adjusted under 35 U.S.C. 154(b) by 1176 days.

(21) Appl. No.: 13/138,160

(22) PCT Filed: Dec. 22, 2009

(86) PCT No.: PCT/EP2009/009224
§ 371 (c)(1),
(2), (4) Date: Sep. 26, 2011

(87) PCT Pub. No.: WO2010/081528
PCT Pub. Date: Jul. 22, 2010

(65) Prior Publication Data
US 2012/0020792 A1  Jan. 26, 2012

(30) Foreign Application Priority Data

Jan. 14, 2009 (DE) .......... 10 2009 004 991

(51) Int. Cl.
| F03D 7/02 | (2006.01) |
| F03D 80/70 | (2016.01) |
| F16C 19/49 | (2006.01) |
| F16C 19/54 | (2006.01) |
| F16C 41/00 | (2006.01) |

(52) U.S. Cl.
CPC ........... *F03D 7/0204* (2013.01); *F03D 80/70* (2016.05); *F16C 19/49* (2013.01); *F16C 19/545* (2013.01); *F16C 41/001* (2013.01); *F16C 2300/14* (2013.01); *F16C 2360/31* (2013.01); *Y02E 10/722* (2013.01); *Y02E 10/723* (2013.01)

(58) Field of Classification Search
CPC .... F03D 7/0204; F03D 11/0008; F03D 80/00; F03D 80/70; F16C 19/49; F16C 19/545; F16C 41/001; F16C 2360/31
USPC ......... 416/174, 26, 147, 149, 153, 154, 167, 416/205; 415/229; 381/461
See application file for complete search history.

(56) References Cited

U.S. PATENT DOCUMENTS

| 3,652,141 A * | 3/1972 | Husten et al. ................. 384/455 |
| 7,481,620 B2 * | 1/2009 | Kirsch et al. .................. 415/229 |
| 8,523,453 B2 * | 9/2013 | Loeschner et al. ........... 384/571 |

(Continued)

FOREIGN PATENT DOCUMENTS

| CN | 201 148 940 | 1/2008 |
| FR | 2 604 753 | 4/1988 |

(Continued)

*Primary Examiner* — Gregory Anderson
*Assistant Examiner* — Christopher R Legendre
(74) *Attorney, Agent, or Firm* — Pandiscio & Pandiscio

(57) ABSTRACT

The invention is directed to a wind power plant having a rotor mounted rotatably about an axis directed approximately in the wind direction, and having at least two mutually concentric annular elements for connection to oppositely rotatable system components of the wind power plant, one of which comprises means for connection to the rotor of the wind power plant or to a drive shaft of a gearbox coupled thereto; at least one element having a freewheel characteristic is disposed between the two connection elements and together with them forms a freewheel, at least one connection element being provided with at least one integrated raceway for a row of rolling bodies rolling thereon.

25 Claims, 4 Drawing Sheets

(56) References Cited

U.S. PATENT DOCUMENTS

| | | | | |
|---|---|---|---|---|
| 9,188,107 B2* | 11/2015 | Minadeo | ............ | F03D 11/0008 |
| 9,188,155 B2* | 11/2015 | Weckbecker | ............ | B66C 23/84 |
| 2004/0211638 A1* | 10/2004 | Ikeda et al. | ................. | 192/41 A |
| 2014/0023305 A1* | 1/2014 | Frank | ................. | F03D 11/0008 |
| | | | | 384/569 |
| 2016/0025068 A1* | 1/2016 | Frank | .................... | F16C 19/188 |
| | | | | 384/492 |

FOREIGN PATENT DOCUMENTS

| | | |
|---|---|---|
| JP | 55 066669 | 5/1980 |
| WO | WO-03/087610 | 10/2003 |
| WO | WO-2007/009629 | 1/2007 |

\* cited by examiner

WIND POWER PLANT

BACKGROUND OF THE INVENTION

1. Field of the Invention

The invention is directed to a wind power plant having a rotor mounted rotatably about an axis directed approximately in the wind direction, and having at least two mutually concentric annular elements for connection to oppositely rotatable system components of the wind power plant, one of which comprises a means for connection to the rotor of the wind power plant or to a drive shaft of a gearbox coupled thereto or of a coupling coupled thereto.

Wind power plants are usually subject to very irregular wind conditions and thus experience sharp load variations, resulting in very high numbers of load cycles in the rotor and the downstream components, especially the gearbox and the generator. Such constantly changing loads impair the fatigue strength of the components involved.

2. Description of the Prior Art

Attempts have therefore been made to integrate, between the hub of the wind wheel and the downstream elements, an elastic coupling that allows a certain relative angle of twist between the two coupled-together components. Once this maximum relative angle of twist is reached, however, any further variations in rotation speed are passed along unchanged to the downstream element, thus severely limiting the damping that can be achieved in this way. Furthermore, substantial accelerations and decelerations occur in the gearbox in this case. This subjects the gearbox to alternating loading, particularly in the form of an alternating load at the roots and in the flank regions of the gear teeth involved. Such alternating loads have a much more detrimental effect on the life of the teeth and other components than do oscillatory loads.

SUMMARY OF THE INVENTION

From the disadvantages of the prior art arises the problem initiating the invention, that of developing a wind power plant of this kind in such a way as to increase the fatigue strength of the components of the rotor, gearbox and/or generator.

This problem is solved by means of at least one element having a freewheel characteristic, disposed between the two connecting elements and forming a freewheel together with them, at least one connecting element being provided with at least one integrated raceway for a row of rolling bodies rolling thereon.

The freewheel is embodied in such a way that it uses a torque generated by the wind wheel or rotor blades to form a rotational lock to the hub of the wind wheel in the normal direction of rotation, and thus transmits this driving torque caused by the wind to the downstream components—preferably the gearbox and/or the generator—whereas in the presence of insufficient torque and/or actual braking torque it goes into freewheel mode, in which the downstream components are not decelerated by the wind wheel, but, due to their inertia, are able to largely maintain their rotation speed or to decrease in speed more slowly than, for example, a wind wheel braked by a gust of headwind. When the wind velocity picks up again and the wind wheel is accelerated again as a result, then, once the rotation speed synchronizes, the freewheel locks rotationally once more and the wind wheel goes back to entraining the connected components, i.e. the gearbox and/or generator, that is supplying energy. This achieves the effect of greatly reducing load amplitudes and thus of extending the life of the rotating components, given otherwise identical component design.

It has proven advantageous for the second ring of the freewheel to be equipped with means for connection to a generator, or to a gearbox or gearbox element, upstream thereof. This makes it possible, in operating mode, to transmit the wind energy via the rotational lock to the gearbox and ultimately to the generator.

It is within the scope of the invention that the freewheel comprises one or preferably a plurality of rollers or wedging bodies that become wedged between the two rings or disengage from them, depending on the direction of rotation. In so doing, the rollers or other wedging bodies undergo very small relative displacements in the gap between the two annular connecting elements of the freewheel. They are able to shift between two (end) positions, one of which corresponds to the freewheeling state and the other to the state of being coupled in a rotationally fixed manner. This can be achieved in particular by having the gap width encountered by the wedging element change (slightly) between these two (end) positions, specifically from a value for the gap width in the freewheeling state that is slightly larger than the relevant extent, particularly the thickness, of the wedging body concerned, to a value for the gap width in the rotationally fixed state that is slightly smaller than the relevant extent, particularly the thickness, of the wedging body concerned.

The invention can be developed further by providing at least one of the two rings with run-up faces that form an angle with the tangent at the point concerned and thus extend at a slant such that the gap they delimit with respect to the other ring tapers, preferably along a ramp, in the same respective direction of rotation. Between each two such ramps there is preferably an abrupt transition from the broadened gap width of one ramp to the tapered gap width of the neighboring ramp. A tip protruding in the radial direction is thus formed at such an abrupt transition, viewed in plan. If these tips point from the hub-side connecting element to the generator-side connecting element, then, when the wind wheel rotates counter to its normal direction, the tapered regions of the gap are each shifted rearward to a position spatially opposite those gap regions of the run-up face for the same wedging body which gradually broaden along a flat ramp. Conversely, if these tips point from the generator-side connecting element to the hub-side connecting element, then, when the wind wheel rotates counter to its normal direction, the broadened regions of the gap are each shifted rearward to a position spatially opposite those gap regions of the run-up face for the same wedging body which gradually taper along a flat ramp.

It is preferred that the run-up faces be implemented as segment bodies and that they be lined up in the circumferential direction of the particular ring and preferably abut each other. This makes it possible to create a complex ring geometry using just one type of segment body and a consistent gradient for the run-up faces.

On the other hand, the run-up faces can also be disposed on spacing elements located between respective neighboring wedging bodies. Such spacing elements can also be used to create a taper in the region of the wedging bodies that causes a wedging action dependent on the direction of rotation.

Yet another embodiment provides that the run-up faces are disposed on one or more cage segment(s), each of which separates adjacent wedging bodies from each other. A plurality of run-up faces can thus be united into one component, which can be produced, for example, by stamping.

The wedging bodies can be implemented as rolling bodies that roll in a raceway of each ring, in which case the spacing elements each provided with a respective run-up face and/or the cage segments having run-up faces are guided in a preferably groove-shaped depression in a raceway. In a depression of this kind, the cage segments receive lateral guidance which ensures that they will remain aligned parallel to the base plane of the rotating assembly regardless of their position.

Further advantages are gained by providing at least one connecting element with occludable openings for introducing the wedging and/or rolling bodies and any spacing elements that may be provided. This creates the possibility of waiting until after the connecting elements are precisely lined up with each other to introduce the wedging bodies or rollers, so the design of the raceways need not be subject to constraints related to the assemblability of the components. Once the freewheel has been fully loaded with wedging bodies, wedging rollers and any spacing elements that are used, the fill opening(s) is/are occluded with plugs that can be screwed in or applied in some other manner.

The freewheel can also be implemented as electrically switchable, in which case the action of switching between the rotationally locked and freewheeling states occurs as a function of the direction of relative rotation between the two rings. This affords the possibility, in particular, of bringing two annular connecting elements into a rotationally fixed positive lock or friction lock by the relative displacement, effected by magnetic force, for example, of one annular component of the rotating assembly in the axial direction, and releasing this positive or friction lock by relative displacement in the opposite direction. An alternative is to use a motor-like arrangement, in which activatable electromagnets on one of the two connecting elements couple together magnetically with (permanent) magnets on the other connecting element of the freewheel, this magnetic coupling being released in the deactivated state.

Furthermore, at least one row of circulating rolling bodies is to be disposed in the gap between the two rings. These circulating rolling bodies brace apart two raceways provided specifically for them and thus help to ensure that the two connecting elements are always aligned coaxially with each other, thus protecting the wedging bodies against damage.

A respective row of circulating rolling bodies is preferably disposed on each side of the freewheel element(s). Optimal bracing of the two connecting elements is achieved with such an arrangement.

The rolling bodies of at least one row in the gap between the two rings of the freewheel can be embodied as balls. Balls receive optimal lateral support in raceways having a concave cross section, and thus, in particular, are able to withstand axial forces and tilting moments in an optimal manner.

It is further provided according to the invention that one or preferably two rings of the freewheel have or has at least one respective flat surface for connection to a rotating machine element. These surfaces serve to establish friction-locking contact with a respective machine component or element. In a first embodiment, both of these connection surfaces face in the same direction in each case, i.e., either up or down relative to the vertical pivot axis of the assembly. In another embodiment, the two connecting surfaces face in opposite directions, i.e., one up and one down.

The invention can be developed further by providing the connecting surface(s) each with a plurality of coronally arranged bores into which fastening screws or fastening bolts can be screwed or through which they can be passed. These serve the function of generating the normal force needed to friction-lock the connection surfaces to the respective adjacent machine component.

The invention is further characterized by an additional annular connecting element concentric with the first two. This third connecting element is rotatable relative to the other two and can therefore be used to effect mounting on a stationary frame of the wind power plant, particularly its gondola. The rotor shaft thus is supported at exactly the axial point where the freewheel sits, so even when there are vibrations in the system it is impossible for the rotor shaft to form an antinode at this point; it is always a vibration node. The freewheel connected at that location thus is protected optimally against damage even when vibrations are present in the wind power plant, which is advantageous for obtaining the longest possible service life for the components involved.

The invention recommends providing, in the region of the gap between the third connecting element and one of the first two connecting elements, at least one raceway on each of these elements for a row of rolling bodies, which roll on the raceway and form a bearing together with the particular connecting elements. This gives the rolling bearing a structure that presents extremely low friction losses, which is especially important in the case of a wind power plant to obtain maximum efficiency along with the ability to absorb a maximal radial force, thus reliably preventing the hub shaft from vibrating in the radial direction.

If—as the invention further provides—the rolling bodies of the bearing are embodied as rollers, then their load-bearing capacity is maximal. This is because the contacts between this type of rolling body and its raceways are not point contacts, as in the case of spherical rolling bodies, for example, but linear contacts, with the attendant greatly reduced surface pressure.

It is within the scope of the invention that one connecting element of the bearing, i.e., the third connecting element or the one immediately adjacent, has a continuously circumferential collar projecting in the radial direction, which collar is embraced in spaced relation by a groove in the other connecting element of the bearing. The gap between the connecting elements concerned, viewed in a cross section transverse to the periphery of the particular connecting rings, thus presents a substantial bulge that is particularly well suited for the transmission of axial forces between these rings.

In the ideal case, the continuously circumferential collar on one of the two connecting elements of the bearing has an approximately rectangular cross section, and a respective row of rolling bodies rolls on each of the three free annular faces of this continuously circumferential collar, i.e., on its top, bottom and front faces. The rolling bodies of a row on the top or bottom face of the collar are thus able to transmit axial thrust in one direction (i.e., for example, top-down forces or forces acting in the opposite direction, from the bottom up), as well as any tilting moments, while the rolling bodies rolling in the region of the end face serve to transmit radial forces. In this approach, optimal load-carrying capacity is provided by roller-shaped, needle-shaped or barrel-shaped rolling bodies.

In addition, a preferably switchable brake can be disposed between the two connecting elements, particularly between the two connecting elements of the bearing. This brake affords the possibility of stopping the rotor shaft of the wind power plant relative to the frame of the wind power plant or gondola, e.g. for repair or maintenance work on a rotor blade.

Taking this inventive idea further, it can be provided to equip a connecting element, particularly a connecting element of the bearing, with a continuously circumferential collar, preferably one that protrudes in the radial direction, whose flanks are suitable for the application of brake shoes. This structure is roughly equivalent to a disk brake.

This arrangement is supplemented by at least one pair of brake shoes that face each other in the axial direction and embrace the circumferential collar on both sides. Since these brake shoes are disposed facing each other, when the brake is actuated they exert opposite axial forces on the circumferential collar of the adjacent connecting element, and the rolling bearings thus remain largely free of axial forces even when the brake is applied.

To actuate the brake, the two brake shoes of a pair should be mutually adjustable in the axial direction. Since the adjacent connecting element and thus also its collar embraced on both sides by the brake shoes are guided by the rolling bodies of the bearing in such a way as to prevent displacement in the axial direction, both brake shoes must be removed from the collar in order to disengage the brake, and, conversely, both shoes must be placed against it to actuate the brake.

Finally, it is within the teaching of the invention that both brake shoes of a pair are hydraulically actuatable. By equalizing the pressure in a hydraulic circuit, it is ensured that both brake shoes always bear with the same force against the mutually facing regions of the embraced collar, and the two axial forces therefore cancel each other out.

Further features, details, advantages and effects based on the invention will become apparent from the following description of a preferred embodiment of the invention and by reference to the drawings.

DESCRIPTION OF THE PREFERRED EMBODIMENTS

Figure 1:
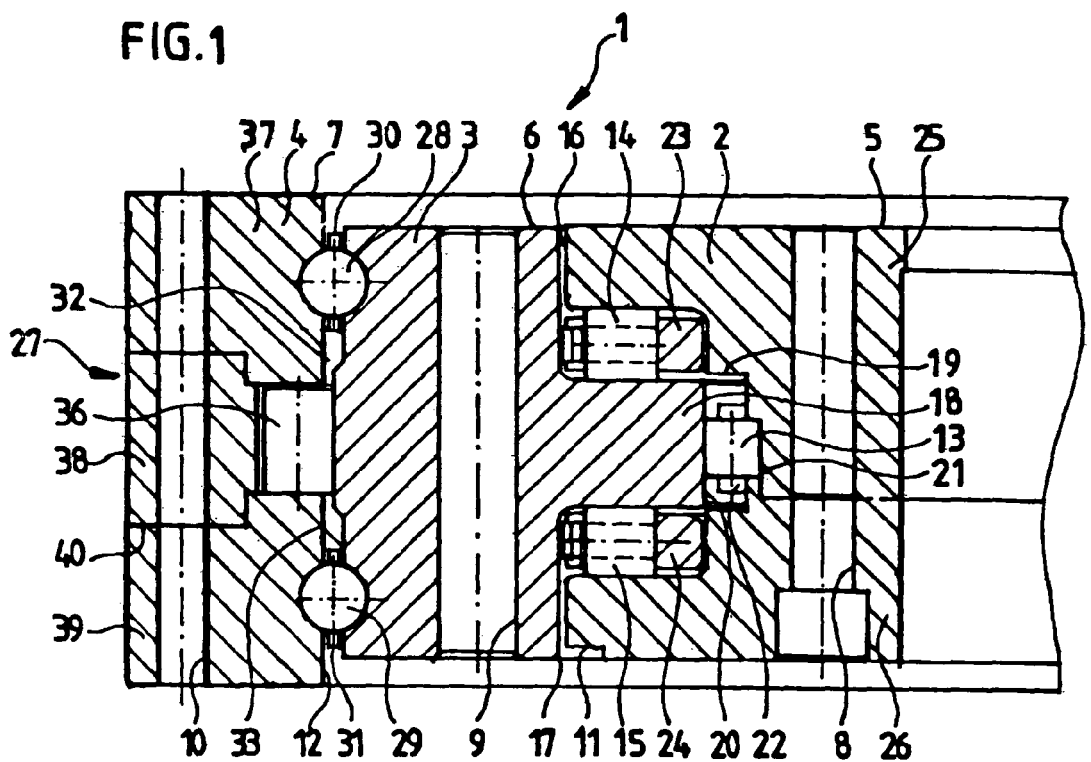
FIG. 1 shows a first embodiment of the invention in a sectional view taken transversely through the joined rings, in partial cutaway.

FIG. 1 shows, as an example of the invention, a cross section through the rings of a rolling bearing 1 for the rotor of a wind power plant, whose wind wheel has an axis of rotation pointing approximately in the direction of the wind. The rolling bearing 1 can be used as the main bearing of the wind power plant, i.e., the bearing that also carries the rotor hub; particularly in the case of a gearless wind power plant. The bearing 1 can also serve as an additional bearing that guides the rotor shaft, or it is connected to a connector, particularly the output, of a gearbox or a coupling in the transmission chain from the wind wheel to the generator.

The bearing 1 includes three rings 2, 3, 4 that are rotatable relative to one another. In the example of FIG. 1, the inner ring 2 is affixed to the frame of the nacelle, the middle ring 3 is connected to the rotor hub or rotor shaft or to the output of a gearbox or coupling, and the outer ring 4 is connected to the rotor of the generator or to a gear element upstream thereof.

For this purpose, each ring 2, 3, 4 is provided with at least one planar connection surface 5, 6, 7, parallel to the ring plane, and with fastening means 8, 9, 10 for securement to the relevant system component. These fastening means 8, 9, 10 are preferably distributed about the pivot axis of the bearing 1, particularly at equidistant intervals. The fastening means are, for example, through-bores or blind bores whose longitudinal axis is parallel to the pivot axis of the bearing 1. Blind bores, in particular, can be provided with an internal thread so that fastening screws, fastening bolts, or the like, can be screwed into them. The bores 8, 9, 10 preferably open in the associated connection surface 5, 6, 7.

Disposed between middle ring 3 and inner ring 2, on the one side, and outer ring 4, on the other side, are respective gaps 11, 12 that make it possible for the rings 2, 3, 4 to rotate smoothly relative to one another. For the purpose of rotatable guidance of the rings 2, 3, 4 on one another, disposed in the region of each gap 11, 12 are respective rolling bodies whose surfaces are, at least locally, rotationally symmetric.

Specifically, middle ring 3 is guided on the radially inwardly disposed ring 2 via one or, in the present example, a plurality of rows of rolling bodies 13, 14, 15. In the present example, there are three rows of rollers 13, 14, 15. Their raceways are situated on the radially outwardly disposed lateral surface 16 of the inner ring 2, on the one hand, and on the radially inwardly disposed lateral surface 17 of the middle ring, on the other hand. To form these raceways, provided on one of these two lateral surfaces 16, 17, preferably on the inner face 17 of middle ring 3, is a continuously circumferential collar 18, which extends in a continuously circumferential, groove-shaped depression 19 in the lateral surface 17, 16 of the respective other ring 2, 3, preferably of inner ring 2.

Disposed between the free end face 20 of the collar 18 and the bottom 21 of the groove 19 is a row of rollers 13 whose axis of rotation is parallel to the pivot axis of the bearing 1, in the manner of a radial bearing; these rollers can, for example, be guided in a cage 22. An additional row of rollers 14, 15 is disposed respectively above and below the collar 18, the axes of rotation of these rollers 14, 15 being oriented radially with respect to the pivot axis of the bearing 1, in the manner of an axial bearing; these rollers 14, 15 can also be guided in respective cages 23, 24. Whereas thrust introduced on the middle ring 3 by the rotor hub is transmitted to the inner ring 2 by the bottom row of rollers 15, in the case of oppositely directed pulling forces this function is performed by the top row of rollers 14; axial forces, on the other hand, are transmitted by the middle row of rollers 13. The raceways for the rollers 13, 14, 15 are preferably integrated directly into the rings 2, 3 concerned, preferably by precision machining of the surfaces in question, particularly of the collar 18, on the one side, and the groove 19, on the other.

To make it possible to assemble such a rolling bearing 1 having two rings 2, 3, one with a collar 18 that engages in a groove 19 in the other one, the ring 2, 3 with the groove 19—here, the radially inwardly disposed ring 2—is divided into two rings 25, 26 resting one on top of the other. This division also separates the groove 19 into an upper and a lower portion; consequently, before the subrings 25, 26 are assembled no groove 19 exists yet, but only two channels, which are not joined together until the collar 18 of the other ring 2, 3—here, middle ring 3—has been seated in these channels.

A design of this kind additionally makes it possible to absorb the tilting moments that can arise on the various rotor blades, for example under irregular wind conditions. The rotor hub is therefore ideally mounted on the frame of the nacelle.

In contrast to conventional wind power plants, however, here the rotor of the generator is not rigidly connected to the rotor hub or to a gearbox downstream thereof, but is coupled to it via a freewheel 27. This freewheel 27 is situated between the middle ring 3 and the outer ring 4, particularly in the region of the gap 12 located between them.

Rotatable guidance between these two rings 3, 4 is additionally ensured by one or more rows of rolling bodies. In the present case, there are two rows of rolling bodies, particularly balls 28, 29. These rolling bodies 28, 29 are disposed in the gap 12 between the middle ring 3 and the outer ring 4, and can be maintained at equidistant positions by respective cages 30, 31. The raceways for these preferably spherical rolling bodies 28, 29 are integrated directly into the rings 3, 4 concerned, preferably by precision machining of the corresponding surfaces, particularly the outer lateral surface 32 of middle ring 3, on the one hand, and the radially inward-lying lateral surface 33 of outer ring 4, on the other.

The freewheel 27 per se is disposed in the axial direction between the two rolling body rows 28, 29. It comprises a plurality of approximately wedge-shaped tapering elements 34 on one of the lateral surfaces 32, 33 bounding the gap 12. These tapering elements 34 collectively ensure that the cross section of the gap 12, particularly its thickness in the radial direction, is not constant, but varies in a sawtooth pattern. The tapering elements 34 are preferably formed on the particular ring 3, 4, for example by being suitably milled onto or out of it in the region of the gap 12. Taken together, the tapering elements 34 preferably extend along the entire circumference of the gap and all have approximately the same cross section and are the same distance apart. They are also all arranged in the same direction of rotation, i.e., in a given direction of rotation the flat ends of all the tapering elements 34 are in front, while their respective other, thickened ends are all disposed in back in this rotation direction. The distance $a_1$ between the flat end and the thickened end of the same tapering element 34 is approximately equal to its height h in the axial direction of the rotary bearing 1, preferably between half and twice the value thereof: $0.5 \cdot h \leq a_1 \leq 2 \cdot h$. The thickened end of one tapering element 34 can be immediately adjacent the flat end of the neighboring tapering element 34 or it can be a distance $a_2$ therefrom, it being preferable that $a_2 \leq a_1$, particularly $a_2 \leq 0.5 \cdot a_1$.

These thickened ends of the tapering elements divide the gap 12 in the region of the freewheel 27 into a multiplicity of compartments 35, which are interconnected, since the maximum radial extent r of the tapering elements 34, even in the vicinity of their thickened ends, is not equal to the thickness d of the gap 12, but is smaller than that value: $r \leq d$, particularly $r \leq 0.5 \cdot d$.

Disposed in each of these compartments 35 is a respective wedging body, preferably a wedging roller 36, particularly having an axis of rotation parallel to the pivot axis of the bearing 1. The diameter D of these rollers 36 is equal to the thickness $d_1$ of the gap 12 at the level of the wedging rollers 36, or is preferably smaller than that value; it may not, however, be smaller than the thickness $d_1$ of the gap 12 minus the maximum radial extent r of the tapering elements 34: $(d_1-r) \leq D \leq d_1$, preferably $(d_1-r) < D < d_1$. This ensures that at the wide end of a compartment 35—i.e., in the region of the flat end of a tapering element 34—the wedging rollers 36 are able to roll between the two rings 3, 4 and ultimately slip through, whereas they become wedged at the narrow end of the particular compartment 35—hence, where the thick end of the particular tapering element 34 is located.

Depending on the relative direction of rotation of the two rings 3, 4, the wedging rollers 36 move—as a result of (rolling) friction—to the wide or narrow end of the respective compartment 35 and, by their state there—slipping through or wedged in place—define the switching state of the freewheel, which permits relative rotation between the two rings 3, 4 in one direction (freewheel) and inhibits such movement in the opposite direction of rotation (locking, torque transmission). The freewheel rotation direction is characterized in that the ring 3, 4 comprising the tapering elements 34 is rotated relative to the other ring 4, 3 in the direction in which the wide end of each compartment 35 is behind its narrower end.

In this freewheel rotation direction, the (outer) ring 4 coupled to the generator side rotates faster than the (middle) ring 3 coupled to the hub of the wind wheel. That is, the rotor of the generator is able to rotate faster—for example, due to its inertial mass—than the wind wheel—for example, temporarily slowed by a gust of headwind. Due to the presence of the freewheel 27, under such wind conditions the generator is momentarily decoupled from the wind wheel and can therefore continue to rotate, for example at a roughly constant speed; and only when the wind force in the driving direction increases again and the wind wheel starts turning faster is it immediately coupled to the generator and goes back to supplying it with wind energy.

The wedging bodies 36 are guided in the axial direction at the level of the tapering bodies 34 by virtue of the fact that the compartments 35 are bounded at the top and bottom. This is achieved by having the gap 12 taper markedly in thickness above and below the compartments 35 receiving the wedging bodies 36, diminishing to a gap thickness $d_2$ that is much smaller than the maximum compartment width $d_1$: $d_2 < d_1$, but is also smaller than the diameter D of a wedging body 36: $d_2 < D$, particularly $d_2 < D/2$; a sort of radial widening or "pocket" for receiving a wedging body 36 is thereby formed in each compartment 35.

Since the flat sides of the tapering bodies 34, i.e., the sides facing the gap 12, are a constant distance from the pivot axis of the bearing 1, i.e., extend, not tangentially, but along secants, these surface regions cannot be produced by turning, but must be, for example, milled. To make it possible to do this conveniently, the outer ring 4 is divided into three subrings 37, 38, 39, of which the upper subring 37 and the lower subring 39 each have a respective raceway for a rolling body row 28, 29, while the subring 38 between them is milled on its inner face to correspond to the sawtooth-shaped profile of the tapering bodies 34.

So that these subrings 37, 38, 39 can be fitted together exactly and with as little play as possible, provided in the region of each boundary surface or abutting surface 40 is a set-down that makes for exact centering during assembly. This set-down can have perpendicular edges in cross section, i.e., a (hollow) cylinder jacket shaped portion; however, conical faces can also be provided instead in the region of the set-down: these still tolerate a certain freedom of play when the parts are first fitted together, but as the parts are pushed together steadily reduce this play, to zero in the ideal case.

Whereas the two rings 3, 4 together form the freewheel 27, rings 2, 3 are coupled to each other merely in the manner of a rotary bearing 41. In general, the two rings 3, 4 of the freewheel 27 should be identified as first ring 4 and second ring 3, and the two rings of the rotary bearing 41, by contrast, as second ring 3 and third ring 2. Second ring 3 is coupled on the one side via freewheel 27 to first ring 4, and on the other side via rotary bearing 41 to third ring 2. In general, second ring 3 is connected to the rotor hub of the wind power plant, while first ring 4 is coupled in a rotationally fixed manner to the generator of the wind power plant, and third ring 2, to support the other two, is anchored to the frame of the nacelle of the wind power plant. Under some circumstances, of course, the rotary bearing could also be disposed between first ring 4 and third ring 2, so that it is primarily the generator-side connecting element 4 that is supported on the nacelle via a bearing arrangement, and the connecting element 3 coupled to the rotor shaft is supported by the generator-side connecting element 4.

Figure 3:
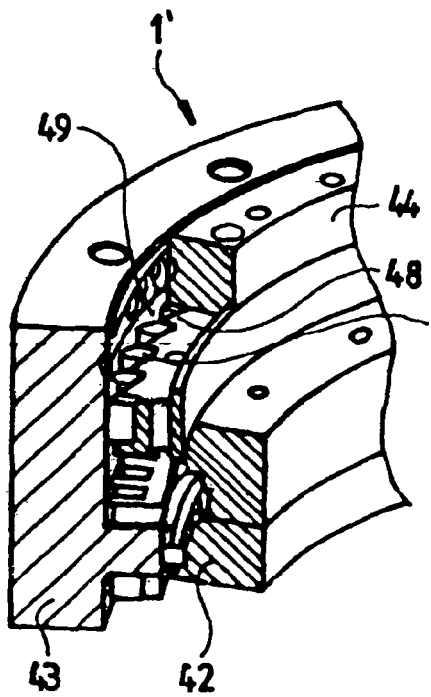
FIG. 3 shows a second embodiment of the invention in a perspective view of a segment of the rings rotated relative to each other, also in cutaway.
Figure 4:
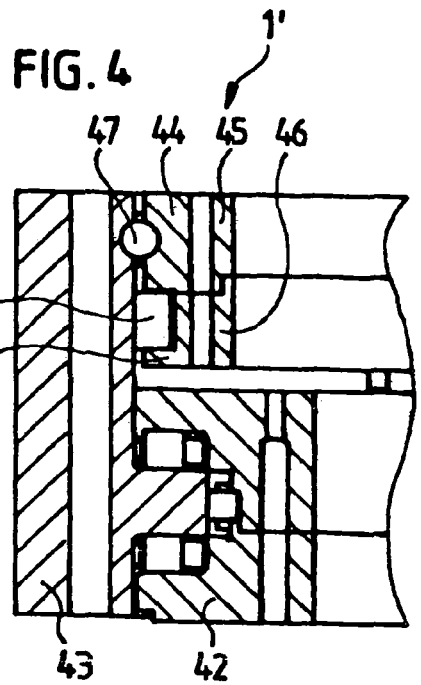
FIG. 4 is a section through the arrangement of FIG. 3, again in cutaway.

FIGS. 3 and 4 show an embodiment of a bearing 1' that is modified with respect to the foregoing. Whereas here an inner ring 42 is provided whose inner geometry exactly matches that of inner ring 2, a ring 43 guided next to it, in contrast to the middle ring 2 of embodiment 1, is extended in the axial direction, approximately to twice the height of inner ring 42. An additional ring 44 is—in similar fashion to outer ring 4 of bearing 1—rotatably guided next to ring 43, but this additional ring 44 is disposed adjacent to, not the outer face of ring 43, but its inner face, and is shifted in the axial direction, particularly upward, in relation to ring 42. As a further particularity, in this embodiment 1' the additional ring 44 is divided into only two subrings 45, 46, with one subring 45 comprising the raceway for one rolling body row 47, particularly in the manner of a radial bearing, whereas sawtooth-shaped tapering bodies 48 are formed onto the other subring 46, particularly by the milling of an initially rotationally symmetrical blank. In this case, pockets 49, each intended to receive a respective freewheel wedging body 50, are formed by a channel in freewheel subring 46, with a cheek 51 embracing the freewheel wedging body 50 in the axial direction.

Figure 2:
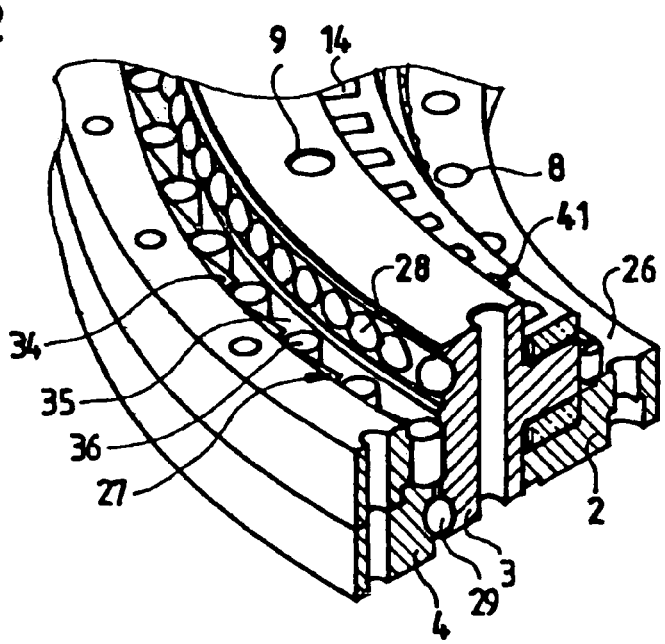
FIG. 2 is a perspective view of a section of the assembly of FIG. 1, also in cutaway, in which part of the outermost ring has been removed to expose the wedging bodies of the freewheel.
Figure 5:
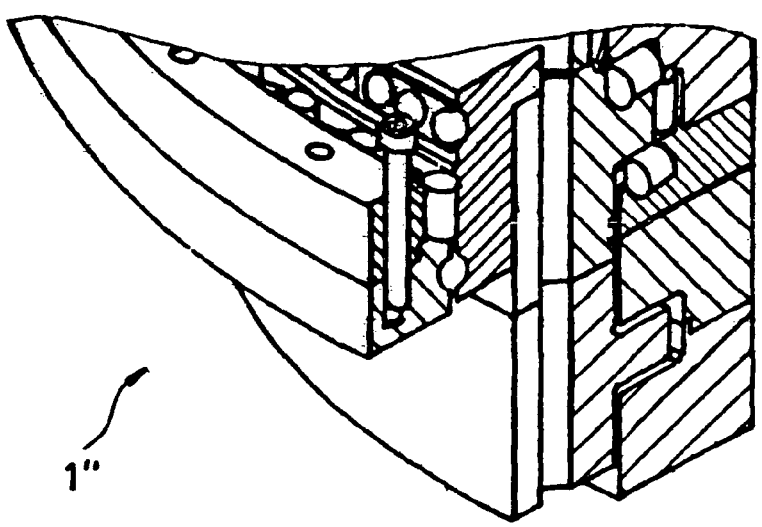
FIG. 5 is a modified embodiment of the invention in a perspective view of a segment of the rings, also in cutaway, in which part of the outermost ring has been removed to expose the wedging bodies of the freewheel.
Figure 6:
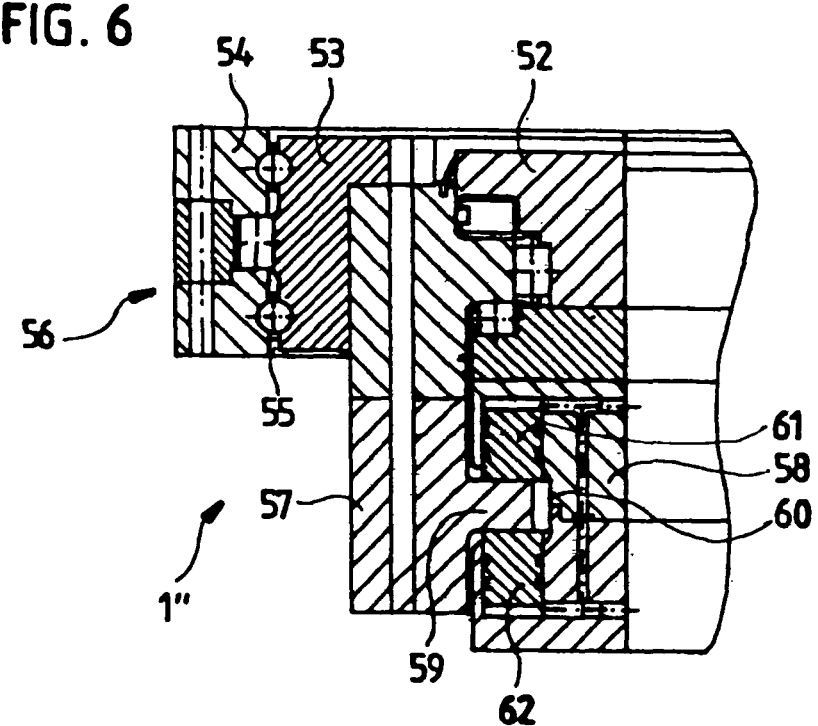
FIG. 6 is a section through the arrangement of FIG. 5, also in cutaway.

Embodiment 1" illustrated in FIGS. 5 and 6 is nearly identical in its upper portion to bearing 1 from FIGS. 1 and 2, and, like that embodiment, comprises an inner ring 52, a middle ring 53 and an outer ring 54, the inner and outer rings 52, 54 each being rotatably guided next to the middle ring 53, and a freewheel 56 being provided in the region of a gap 55 between middle ring 53 and outer ring 54.

As a particularity, however, in this embodiment 1" the middle ring 53 and the outer ring 54 are both extended in the same axial direction—downward, in the drawing—for example by means of respective flanged-on supplemental rings 57, 58.

These supplemental rings 57, 58 serve as a brake, by means of which the middle ring 53, which is preferably the one coupled to the rotor hub, can be slowed or even locked in place against the outer ring 54, which is preferably the one affixed to the frame of the nacelle.

For this purpose, formed onto one of the two supplemental rings 57, 58—in the drawing, supplemental ring 57 of middle ring 53—is a brake disk 59 in the form of a collar projecting in the radial direction, facing the other supplemental ring 58. The opposite supplemental ring 58 is given a "C"-like cross section, with, facing the brake disk 59, a groove 60 in which the brake disk 59 engages.

Provided on each side of the brake disk 59, i.e., beyond its top and bottom flanks, are respective brake shoes 61, 62, specifically disposed opposite each other in pairs and in mutual alignment parallel to the pivot axis of the bearing 1". There is preferably a plurality of such brake shoe pairs 61, 62, for example distributed over the circumference, particularly at equidistant positions. The brake shoes 61, 62 are embodied, for example, as pistons that are displaceable in the axial direction in a cylindrical bushing and can be acted upon at their respective back faces by a brake fluid, for example hydraulic oil or the like, causing them to bear against the particular flank of the brake disk 59 so as to brake the latter and thus the supplemental ring 57 of middle ring 53, and thus, for example, to slow or actually lock the rotor hub of the wind wheel. If these preferably hydraulically actuatable brake shoes 61, 62 are guided in the supplemental ring 58 affixed to the nacelle frame, they do not rotate with the rotor hub, so the hydraulic lines are very easy to route.

Figure 7:
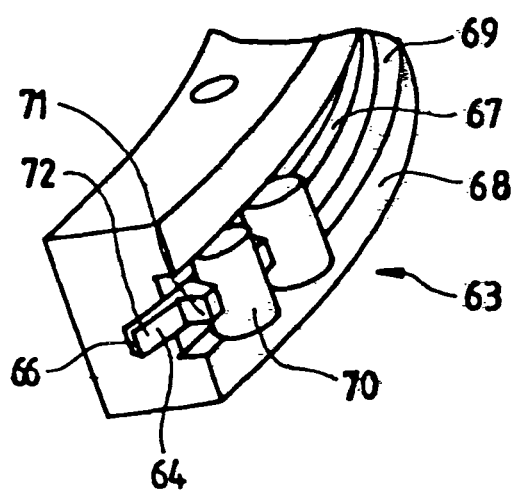
FIG. 7 is a perspective view of a segment of a ring of a freewheel according to yet another embodiment of the invention, again in cutaway, together with a number of wedging rollers engaging therein and a cage segment comprising the run-up faces.
Figure 8:
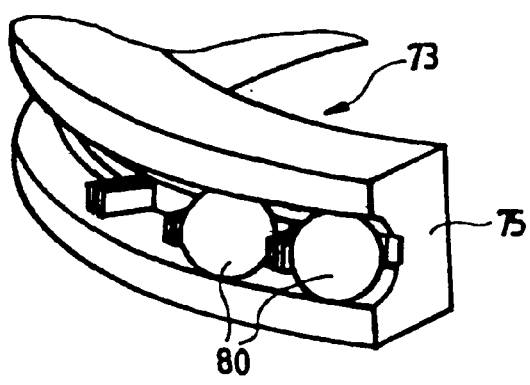
FIG. 8 shows a freewheel ring according to a further-modified embodiment of the invention in a representation corresponding to FIG. 7, together with a number of spherical wedging bodies engaging therein, and spacing elements each having a respective run-up face.
Figure 9:
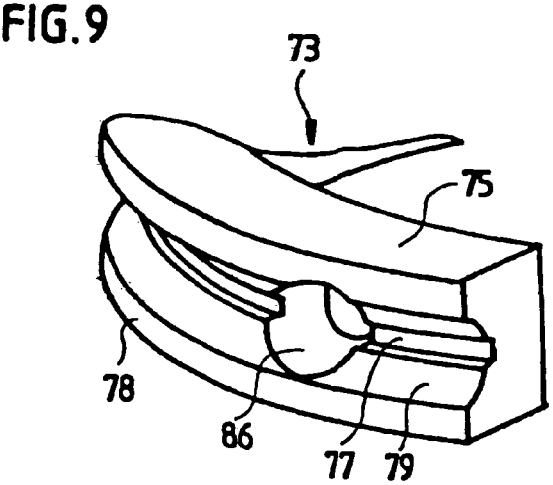
FIG. 9 shows the freewheel ring of FIG. 8 after removal of the spherical wedging bodies and the spacing elements comprising the run-up faces.
Figure 10:
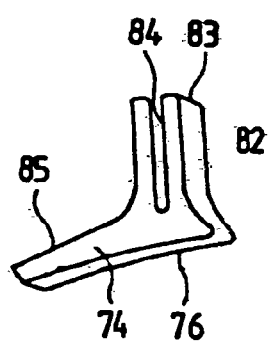
FIG. 10 shows a spacing element of FIG. 8 with a run-up face for a wedging body in a perspective view.
Figure 11:
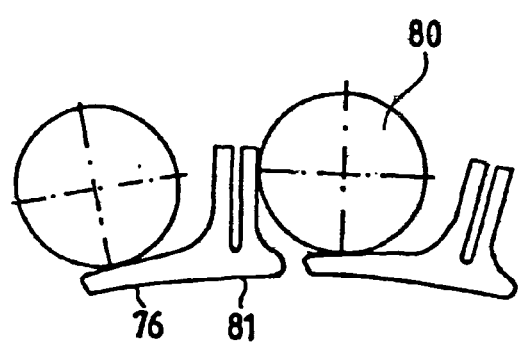
FIG. 11 is a side view of a number of spacing elements according to FIG. 10, with a wedging body engaged in each of them.

FIG. 7 shows part of a modified freewheel 63. This freewheel 63 differs from those previously described in that here the tapering bodies 64 are not formed on the particular ring 65, but are disposed on a dedicated strip 66, similar to the cage for a row of rolling bodies. This strip 66 can be guided in a groove-shaped depression 67 in the region of a gap 68, particularly in the region of a depression 69 that is pocket-shaped in cross section and is provided to receive wedging bodies 70, embodied, for example, as rollers. Formed on the strip 66 at equidistant intervals are respective dividers 71, each of which, together with the top and bottom flanks of the pocket-shaped depression 69, forms a compartment for receiving a wedging body 70. These dividers 71 can, for example, each have a trapezoidal outline in plan. Between two such neighboring dividers 71 the thickness of the strip is not constant, but tapers continuously from one of the two dividers 71 to the next, and in the same direction of rotation in all the compartments. Flat regions 72 of the strip with a slightly varying thickness serve as run-up faces for the wedging bodies 70: at the tapered locations of the flat regions 72 of the strip 66, the compartments widen; here, the wedging bodies 70 are able to slip through between the two rings 65 of the freewheel, whereas at the thickened locations of the flat regions 72, where the compartments become narrower, they become wedged. Since they simultaneously press the strip 66 firmly against the bottom of the depression 67, a friction lock is also created between the strip 66 and the particular ring 65—the freewheel 63 is in the locked state, and the switching of the freewheel to the locked state occurs in each case as a function of the direction of relative rotation between the particular rings 65 of the freewheel 63.

Finally, FIGS. 8 to 11 depict the elements of another freewheel 73. In this arrangement, tapering elements 74 are connected neither to a particular ring 75 of the freewheel 73 nor to a common strip, but rather, respective individual parts are disposed in the manner of spacers between the rolling bodies of a rolling bearing.

Each tapering element 74 has a base 76 that is guided in a continuously circumferential, groove-shaped depression 77 in a gap 78, particularly in the region of a cross-sectionally concavely curved widening 79 of the gap 78 that is provided to receive wedging bodies 80, embodied, for example, as balls. This base 76 has a bottom face 81 that is complementary to the curvature at the bottom of the groove-shaped depression 77, which curvature is convex, assuming guidance on the outer face of the radially inwardly disposed ring 75 of the freewheel 73, so the complementary surface in this case is slightly concavely curved.

Each tapering element 74 has an upper face disposed opposite this bottom face 81 and subdivided into two members: provided at one end of the upper face is a divider 82, which projects steeply away from the bottom face 81, and which—as illustrated in the drawing—can be provided with a slit 84 extending in from its free end face 83, thus forming two resilient tongues with a relatively high elasticity. In the remaining region 85, the upper face of the tapering element 74 is relatively flat, but with a continuously varying thickness: the thickness of the flat region 85 preferably decreases gradually from the divider 82 to the opposite end of the tapering element 74. At this end of the flat region, the wedging bodies 80 have enough space and therefore allow the rings 75 of the freewheel 73 to rotate freely relative to one another. Near the transition from the flat region 85 to the divider 82, however, the remaining clear cross section of the particular compartment is so small that the wedging bodies 80 become wedged there between the run-up face and the facing ring of the freewheel 73 and thereby switch the freewheel 73 to the locked state, in which drive energy can be transmitted from the wind wheel to the generator.

So that it is still possible to insert or replace the, for example, spherical wedging bodies 80 and the tapering bodies 74 even after the freewheel 73 has been assembled, provided in the region of the cross-sectional widening 79 of the gap 78 is one or more openings 86 with a diameter such that a wedging body 80 or tapering body 74 can be pushed through them. After the freewheel 73 has been completely filled with wedging bodies 80 and tapering bodies 74, this opening, or these openings, 86 is/are occluded, for example, each with a respective plug (not shown in the drawing). The latter can, for example, have a thread that engages in an internal thread of the opening 86 concerned.

The invention claimed is:

1. A wind power plant having a rotor mounted rotatably about an axis directed generally in a wind direction, and having at least two mutually concentric annular connection elements (2, 3, 4; 42, 43, 44; 52, 53, 54) for connection to oppositely rotatable system components of said wind power plant, at least one of which comprises a plurality of coronally arranged bores (8, 9, 10) for connection to the rotor of the wind power plant or to a drive shaft of a gearbox coupled thereto, comprising at least one freewheel element disposed between two of the annular connection elements (3, 4; 43, 44; 53, 54) and together therewith forms a freewheel (27; 56; 63; 73), which uses a torque generated by a wind wheel or rotor blades at a hub of the wind wheel in a normal direction of rotation to form a rotational locking mode, and thus transmits this driving torque caused by the wind to downstream components, whereas in the presence of insufficient torque and/or actual braking torque, the freewheel (27; 56; 63; 73) goes into a freewheeling mode, in which the downstream components are not decelerated by the wind wheel, wherein (a) at least one of the annular connection elements (3, 4; 43, 44; 53, 54) of the freewheel (27; 56; 63; 74) is provided with run-up faces (85) in the form of ramps, which extend at a slant such that regions of a gap, which is delimited by the run-up faces, taper with respect to the other annular connection element (3, 4; 43, 44; 53, 54) of the freewheel (27; 56; 63; 74) in a same direction of rotation, so that wedging bodies will become wedged between the run-up faces and the other annular connection element (3, 4; 43, 44; 53, 54) of the freewheel (27; 56; 63; 74) to get in the rotational locking mode of the freewheel (27; 56; 63; 74), (b) said annular connection elements (3, 4; 43, 44; 53, 54) of the freewheel (27; 56; 63; 73) have at least one planar connection surface (6, 7) for connection to a rotating machine element, (c) wherein the at least one planar connection surface (6, 7) of said freewheel (27; 56; 63; 73) comprises the plurality of coronally arranged bores (8, 9, 10) for screwing fastening means in or for passing fastening means through, and (d) wherein at least one of the annular connection elements (2, 3, 4; 42, 43, 44; 52, 53, 54) is provided with at least one integrated raceway for a respective row of rolling bodies (13, 14, 15, 28, 29; 47) rolling thereon.

2. The wind power plant as in claim 1, wherein one of the annular connection elements (3, 4; 43, 44; 53, 54) of the freewheel (27; 56; 63; 73) comprises at least one of the plurality of coronally arranged bores (8, 9, 10) for permitting connection to a generator or to a gearbox or gearbox element upstream of a generator.

3. The wind power plant as in claim 1, wherein the wedging bodies of the freewheel (27; 56; 63; 73) are adapted to become wedged between the two annular connection elements (3, 4; 43, 44; 53, 54) of said freewheel (27; 56; 63; 73) or disengage therefrom, depending on the direction of rotation.

4. The wind power plant as in claim 3, wherein said wedging bodies are embodied as rolling bodies that roll in a raceway between the annular connection elements (3, 4; 43, 44; 53, 54) of the freewheel element (27; 56; 63; 73), wherein spacing elements (34; 64; 74) each having a run-up face (85) and/or said cage-like or strip-like segments (66) comprising the run-up faces (85) being guided in a groove-shaped depression (67; 77) of the raceway.

5. The wind power plant as in claim 4, wherein occludable openings (86) are disposed in at least one of said annular connection elements (2, 3, 4; 42, 43, 44; 52, 53, 54) for the introduction of the wedging bodies and/or for the introduction of the rolling bodies (13, 14, 15, 28, 29; 47) and/or for the introduction of said spacing elements (34, 64, 74).

6. The wind power plant as in claim 1, wherein the run-up faces (85) extend obliquely so that the gap bounded by each of the annular connection elements of the freewheel (27; 56; 63; 73) tapers in a same direction of rotation.

7. The wind power plant as in claim 6, wherein said run-up faces (85) are embodied as segments (34; 64; 74) that are arranged in a row in a circumferential direction of the at least one of the annular connection elements (3, 4; 43, 44; 53, 54) of the freewheel (27; 56; 63; 73).

8. The wind power plant as in claim 6, wherein said run-up faces (85) are disposed on spacing elements (74) that are each located between the neighboring wedging bodies.

9. The wind power plant as in claim 6, wherein said run-up faces (85) are disposed on at least one cage-like or strip-like segment (66) that holds the respective adjacent wedging bodies in spaced-apart relation.

10. The wind power plant as in claim 1, wherein the freewheel (27; 56; 63; 73) is configured as electrically switchable, a switchover between rotationally locking and freewheeling modes taking place in dependence on a relative direction of rotation between said two annular connection elements of the freewheel (3, 4; 43, 44; 53, 54).

11. The wind power plant as in claim 1, wherein one of the annular connection elements (2, 3, 4; 42, 43, 44; 52, 53, 54) comprises a continuously circumferential collar (18), which protrudes in a radial direction and which is embraced in spaced relation by a groove (19) in another of the annular connection elements (2, 3, 4; 42, 43, 44; 52, 53, 54).

12. The wind power plant as in claim 11, wherein said continuously circumferential collar (18) on one of said two annular connection elements (2, 3, 4; 42, 43, 44; 52, 53, 54) has a generally rectangular cross section.

13. The wind power plant as in claim 12, wherein the at least one row of rolling bodies (13, 14, 15, 28, 29; 47) rolls on a free annular surface of said continuously circumferential collar (18).

14. The wind power plant as in claim 1, wherein a switchable brake is disposed between two of said annular connection elements (2, 3, 4; 42, 43, 44; 52, 53, 54).

15. The wind power plant as in claim 14, wherein provided on one of said annular connection elements, is a continuously circumferential collar (59) that protrudes in a radial direction and which comprises flanks adapted for the application of brake shoes (61, 62).

16. The wind power plant as in claim 15, wherein at least one pair of said brake shoes (61, 62) that face each other in an axial direction embrace said continuously circumferential collar (59) on both sides thereof.

17. The wind power plant as in claim 16, wherein said two brake shoes (61, 62) of the pair are adjustable relative to each other in an axial direction in order to actuate the brake.

18. The wind power plant as in claim 17, wherein said two brake shoes (61, 62) of the pair are hydraulically adjustable.

19. A wind power plant having a rotor mounted rotatably about an axis directed generally in a wind direction, and having at least two mutually concentric annular connection elements (2, 3, 4; 42, 43, 44; 52, 53, 54) for connection to oppositely rotatable system components of the wind power plant, at least one of which comprises a plurality of coronally arranged bores (8, 9, 10) for connection to the rotor of said wind power plant or to a drive shaft of a gearbox coupled thereto, comprising at least one freewheel element disposed between two of the annular connection elements (3, 4; 43, 44; 53, 54) and together therewith forms a freewheel (27; 56; 63; 73), and wherein a further annular connection element (2; 42; 52) is provided concentrically to the two annular connection elements (3, 4; 43, 44; 53, 54) of the freewheel (27; 56; 63; 73), which uses a torque generated by a wind wheel or rotor blades at a hub of the wind wheel in a normal direction of rotation to form a rotational locking mode, and thus transmits this driving torque caused by the wind to the downstream components, whereas in the presence of insufficient torque and/or actual braking torque, the freewheel (27; 56; 63; 73) goes into a freewheeling mode, in which the downstream components are not decelerated by the wind wheel, wherein (a) at least one of the annular connection elements (3, 4; 43, 44; 53, 54) of the freewheel (27; 56; 63; 74) is provided with run-up faces (85) in the form of ramps, which extend at a slant such that regions of a gap, which is delimited by the run-up faces, taper with respect to the other annular connection element (3, 4; 43, 44; 53, 54) of the freewheel (27; 56; 63; 74) in a same direction of rotation, so that wedging bodies will become wedged between the run-up faces and the other annular connection element (3, 4; 43, 44; 53, 54) of the freewheel (27; 56; 63; 74) to get in the rotational locking mode of the freewheel (27; 56; 63; 74), (b) wherein each of the wedging bodies is able to move between two end positions, one of which corresponds to the freewheeling mode and the other to the locked state of the freewheel (27; 56; 63; 74), wherein a width of the gap region encountered by each of the wedging bodies changes between said two end positions from a value for the width of the gap region at the end position for the freewheeling mode that is larger than a thickness of the wedging body concerned to a value for the width of the gap region at the end position for the rotational locking mode that is smaller than the thickness of the wedging body concerned, (c) wherein both of the annular connection elements (3, 4; 43, 44; 53, 54) of the freewheel (27; 56; 63; 73) each have at least one planar connection surface (6, 7) for connection to a rotating machine element, (d) wherein each at least one planar connection surface (6, 7) of said annular connection elements (3, 4; 43, 44; 53, 54) of the freewheel (27; 56; 63; 73) comprises the plurality of coronally arranged bores (8, 9, 10) for screwing fastening means in or for passing fastening means through, (e) wherein at least one of the annular connection elements (2, 3, 4; 42, 43, 44; 52, 53, 54) is further provided with at least one integrated raceway for a respective row of rolling bodies (13, 14, 15, 28, 29; 47) rolling thereon.

20. The wind power plant as in claim 19, wherein disposed in the gap between two of said at least two annular connection elements (2, 3, 4; 42, 43, 44; 52, 53, 54) is the at least one row of the rolling bodies (13, 14, 15, 28, 29; 47).

21. The wind power plant as in claim 20, wherein each of two sides of said at least one freewheel element (27; 56; 63; 73) has one of the at least one row of rolling bodies (13, 14, 15, 28, 29; 47).

22. The wind power plant as in claim 21, wherein said rolling bodies (13, 14, 15, 28, 29; 47) comprise rollers.

23. The wind power plant as in claim 20, wherein said rolling bodies (13, 14, 15, 28, 29; 47) of the at least one row in the gap between said two annular connection elements (3, 4; 43, 44; 53, 54) of said freewheel (27; 56; 63; 73) comprise balls.

24. The wind power plant as in claim 19, wherein said further annular connection element (4; 42; 52) provided concentrically to said two annular connection elements (3, 4; 43, 44; 53, 54) of the freewheel (27; 56; 63; 73) serves to effect connection to a frame of a nacelle of said wind power plant.

25. A wind power plant having a rotor mounted rotatably about an axis directed generally in a wind direction, and having at least two mutually concentric annular connection elements (2, 3, 4; 42, 43, 44; 52, 53, 54) for connection to oppositely rotatable system components of said wind power plant, at least one of which comprises a plurality of coronally arranged bores (8, 9, 10) for connection to the rotor of the wind power plant or to a drive shaft of a gearbox coupled thereto, comprising at least one freewheel element disposed between two of the annular connection elements (3, 4; 43, 44; 53, 54) and together therewith forms a freewheel (27; 56; 63; 73), which uses a torque generated by a wind wheel or rotor blades at a hub of the wind wheel in the normal direction of rotation to form a rotational locking mode, and thus transmits this driving torque caused by the wind to the downstream components, whereas, in the presence of insufficient torque and/or actual braking torque, the freewheel (27; 56; 63; 73) goes into a freewheeling mode, in which the downstream components are not decelerated by the wind wheel, wherein (a) at least one of the annular connection elements (3, 4; 43, 44; 53, 54) of the freewheel (27; 56; 63; 74) is provided with run-up faces (85) in the form of ramps, which extend at a slant such that regions of a gap, which is delimited by the run-up faces, taper with respect to the other annular connection element (3, 4; 43, 44; 53, 54) of the freewheel (27; 56; 63; 74) in a same direction of rotation, so that wedging bodies will become wedged between the run-up faces and the other annular connection element (3, 4; 43, 44; 53, 54) of the freewheel (27; 56; 63; 74) to get in the rotational locking mode of the freewheel (27; 56; 63; 74), (b) wherein each of the wedging bodies (80) is able to move between two end positions, one of which corresponds to the freewheeling mode and the other to the rotational locking mode of the freewheel (27; 56; 63; 74), wherein a width of the gap region encountered by each of the wedging bodies changes between said two end positions from a value for the width of the gap region at the end position for the freewheeling mode that is larger than a thickness of the wedging body concerned to a value for the width of the gap region at the end position for the rotational locking mode that is smaller than the thickness of the wedging body concerned, (c) wherein the wedging bodies (80) are embodied as wedging rollers which, at the end position for the freewheeling mode, are able to roll between the two annular connection elements (3, 4; 43, 44; 53, 54) of the freewheel (27; 56; 63; 74) and ultimately slip through, (d) wherein said annular connection elements (3, 4; 43, 44; 53, 54) of the freewheel (27; 56; 63; 74) have at least one planar connection surface (6, 7) for connection to a rotating machine element, (e) wherein the at least one planar connection surface (6, 7) of said annular connection elements (3, 4; 43, 44; 53, 54) of said freewheel (27; 56; 63; 73) comprises the plurality of coronally arranged bores (8, 9, 10) for screwing fastening means in or for passing fastening means through, and (f) wherein at least one of the annular connection elements (2, 3, 4; 42, 43, 44; 52, 53, 54) is provided with at least one integrated raceway for a respective row of rolling bodies (13, 14, 15; 28, 29; 47) rolling thereon.

\* \* \* \* \*